United States Patent [19]

Stentiford

[11] Patent Number: 5,503,560
[45] Date of Patent: Apr. 2, 1996

[54] LANGUAGE TRAINING

[75] Inventor: Frederick W. M. Stentiford, Woodbridge, England

[73] Assignee: British Telecommunications, England

[21] Appl. No.: 659,398

[22] PCT Filed: Jul. 25, 1989

[86] PCT No.: PCT/GB89/00846

§ 371 Date: Feb. 25, 1991

§ 102(e) Date: Feb. 25, 1991

[87] PCT Pub. No.: WO90/01203

PCT Pub. Date: Feb. 8, 1990

[30] Foreign Application Priority Data

Jul. 26, 1988 [GB] United Kingdom ............... 8817795

[51] Int. Cl.$^6$ ................................. G09B 19/00
[52] U.S. Cl. .................. 434/167; 434/156; 434/157; 434/169; 434/178; 434/185
[58] Field of Search ............... 381/41–43; 434/167, 434/185, 156, 157, 176; 364/419.01

[56] References Cited

U.S. PATENT DOCUMENTS

| | | | |
|---|---|---|---|
| 3,703,602 | 11/1972 | Shensheu | 434/157 |
| 3,946,504 | 3/1976 | Nakano | 434/185 |
| 4,507,750 | 3/1985 | Frantz et al. | 364/900 |
| 4,615,680 | 10/1986 | Tomatis | 434/185 X |
| 4,884,972 | 12/1989 | Gasper | 434/185 |

FOREIGN PATENT DOCUMENTS

| | | |
|---|---|---|
| 0094502 | 11/1983 | European Pat. Off. . |
| 0225729 | 6/1987 | European Pat. Off. . |
| 0262938 | 4/1988 | European Pat. Off. . |
| 2167224 | 5/1986 | United Kingdom . |

Primary Examiner—Richard J. Apley
Assistant Examiner—Glenn E. Richman
Attorney, Agent, or Firm—Nixon & Vanderhye

[57] ABSTRACT

A speech synthesizer (3) produces prompts in the voice of a native speaker of a language to be learned to which the student replies or imitates. A phrase recognizer (1) employs keyword recognition to generate from the student's prompted response an original speech template spoken by the student. Thereafter, interactive dialogue takes place. The student's progress in that dialogue is monitored by measuring the deviation of the student's current speech from his original speech template. When this deviation is sufficiently large so that the recognizer (1) no longer recognizes what the student is saying, the system retrains and updates the student's speech template. In another embodiment, the system includes a display which shows the native speaker's mouth shape while the words to be imitated are spoken by the speech synthesizer (3). Also provided are a video pick-up and analyzer for analyzing the shapes of the student's mouth to give the student visual feedback.

21 Claims, 2 Drawing Sheets

LANGUAGE TRAINING

This invention relates to apparatus and methods for training pronunciation; particularly, but not exclusively, for training the pronunciation of second or foreign languages.

One type of system used to automatically translate speech between different foreign languages is described in our European published patent application number 0262938A. This equipment employs speech recognition to recognise words in the speaker's utterance, pattern matching techniques to extract meaning from the utterance and speech coding to produce speech in the foreign tongue.

This invention uses similar technology, but is configured in a different way and for a new purpose, that of training a user to speak a foreign language.

This invention uses speech recognition not only to recognise the words being spoken but also to test the consistency of the pronunciation. It is a disposition of novice students of language that, although they are able to imitate a pronunciation, they are liable to forget, and will remain uncorrected until they are checked by an expert. A machine which was able to detect mispronunciation as well as translation inaccuracies would enable students to reach a relatively high degree of proficiency before requiring the assistance of a conventional language teacher to progress further. Indeed, very high levels of linguistic skill are probably not required in the vast majority of communication tasks, such as making short trips abroad or using the telephone, and computer aided language training by itself may be sufficient in these cases.

Conventional methods either involve expensive skilled human teachers, or the use of passive recordings of foreign speech which do not test the quality of the student's pronunciation.

Some automated systems provide a visual display of a representation of the student's speech, and the student is expected to modify his pronunciation until this display matches a standard. This technique suffers from the disadvantage that users must spend a great deal of time experimenting and understanding how their speech relates to the visual representation.

Another approach (described for example in Revue de Physique Appliquee vol 18 no. 9 Sept 1983 pp 595–610, M. T. Janot-Giorgetti et al, "Utilisation d'un systeme de reconnaissance de la parole comroe aide a l'acquisition orale d'une langue etrangere") employs speaker independent recognition to match spoken utterances against standard templates. A score is reported to the student indicating how well his pronunciation matches the ideal. However, until speaker independent recognition technology is perfected, certain features of the speaker's voice, such as pitch, can affect the matching scores, and yet have no relevant connection with the quality of pronunciation. A student may therefore be encouraged to raise the pitch of his voice to improve his score, and yet fail to correct an important mispronunciation.

Furthermore, current speaker independent recognition technology is unable to handle more than a small vocabulary of words without producing a very high error rate. This means that training systems based on this technology are unable to process and interpret longer phrases and sentences. A method of training pronunciation for deaf speakers is described in Proceedings ICASSP 87 vol 1 pp 372–375 D. Kewley-Port et al 'Speaker-dependant Recognition as the Basis for a Speech Training Aid'. In this method, a clinician selects the best pronounced utterances of a speaker and these are convened into templates. The accuracy of the speaker's subsequent pronunciation is indicated as a function of his closeness to the templates (the closer the better). This system has two disadvantages; firstly, it relies upon human intervention by the clinician, and secondly the speaker cannot improve his pronunciation over his previous best utterances but only attempt to equal it.

According to the invention there is provided apparatus for pronunciation training comprising;

speech generation means for generating utterances; and speech recognition means arranged to recognise in a trainee's utterances, the words from a predetermined selected set of words, wherein the speech recognition means is arranged to employ speaker-dependent recognition, by comparing the trainee's utterance with templates for each word of the set, and the apparatus is arranged initially to generate the templates by prompting the trainee to utter each word of the set and forming the templates from such utterances, the apparatus being further arranged to indicate improvements in pronunciation with increases in the deviation of the trainee's subsequent utterances from the templates.

Some non-limitative examples of embodiments of the invention will now be described with reference to the drawings, in which.

Figure 1:
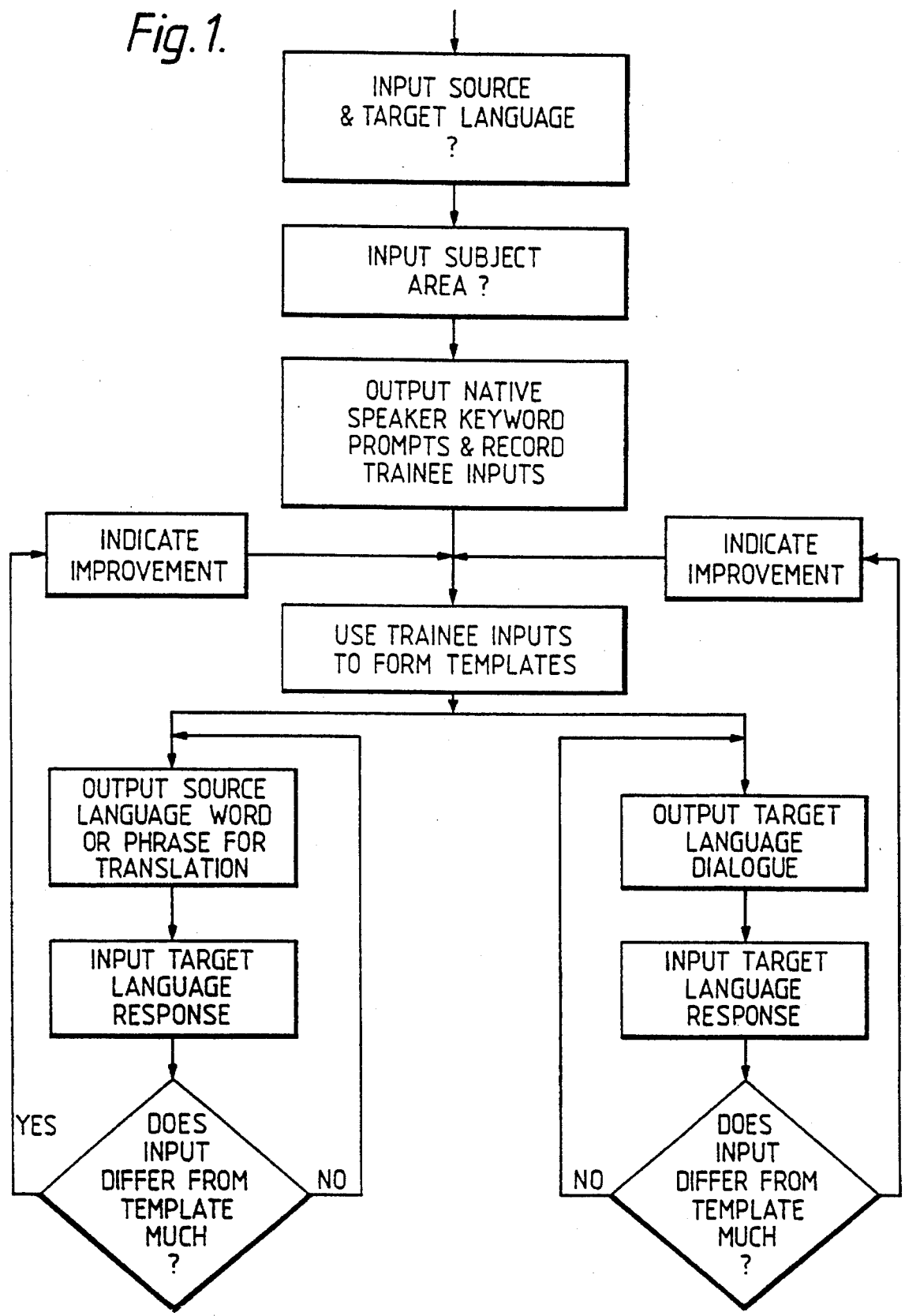
FIG. 1 illustrates stages in a method of language training according to one aspect of the invention.
Figure 2:
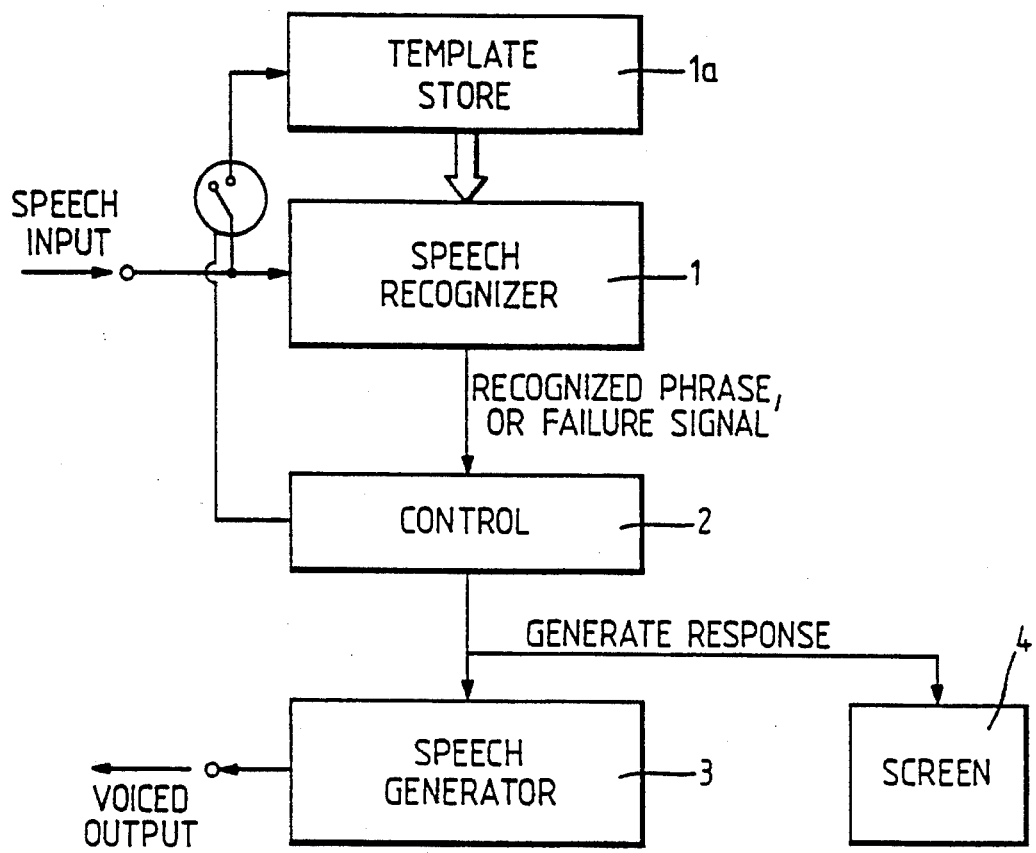
FIG. 2 illustrates schematically apparatus suitable for performing one aspect of the invention.

Referring to FIGS. 1 and 2, upon first using the system illustrated, the student is asked by the system (using either a screen and keyboard or conventional speech synthesiser and speaker independant recogniser ) which language he wishes to study, and which subject area (eg operating the telephone or booking hotels) he requires. The student then has to carry out a training procedure so that the speaker dependent speech recogniser 1 can recognise his voice. To this end, the student is prompted in the foreign language by a speech generator 3 employing a pre-recorded native speaker's voice to recite a set of keywords relevant to his subject area. At the same time, the source language translation of each word is displayed, giving the student the opportunity to learn the vocabulary. This process, in effect, serves as a passive learning stage during which the student can practise his pronunciation, and can repeat words as often as he likes until he is satisfied that he has imitated the prompt as accurately as he believes he can.

A control unit 2 controls the sequence of prompts and responses. Conveniently, the control unit may be a personal computer (for example, the IBM PC).

These utterances are now used as, or to generate, the first set of templates stored in template store 1a to be used by the speech recogniser 1 to process the student's voice. The templates represent the student's first attempt to imitate the perfect pronunciation of the recorded native speaker.

The second stage of the training process simply tests the ability of the student to remember the translations and pronunciations of the key word vocabulary. He is prompted in his source language (either visually, on screen 4, or verbally by speech generator 3) to pronounce translations of the keywords he has practised in the previous stage. After each word is uttered, the speech generator 3 repeats the foreign word recognised by the recogniser 1 back to the student and displays the source language equivalent. Incorrect translations are noted for re-prompting later in the training cycle. The student is able to repeat words as often as he wishes, either to refine his pronunciation or to correct a machine misrecognition. If the recogniser 1 consistently (more than, say, 5 times) misrecognises a foreign word, either because of a low distance score or because two words are recognised with approximately equal distances, the student will be asked to recite this word again (preferably several times), following a native speaker prompt from the generator 3, so that a new speech recognizer template can be produced to replace the original template in store 1a. Such action in fact indicates that the student has changed his pronunciation after having heard the prompt several more times, and is converging on a more accurate imitation of the native speaker. This method has the advantage over the prior art that the trainee's progress is measured by his deviation from his original (and/or updated) template, rather than by his convergence on the native speaker's template, thus eliminating problems due to pitch, or other, differences between the two voices. Once the student is satisfied that he has mastered the key word vocabulary, he may move to the third training stage.

The student is now prompted in his own language (either visually on screen 4 or verbally through generator 3) and may be asked to carry out verbal translations of words or complete phrases relevant to his subject area of interest. Alternatively, these prompts may take the form of a dialogue in the foreign language to which the student must respond. One useful method of prompting is a 'storyboard' exercise using a screen display of a piece of text, with several words missing, which the student is prompted to complete by uttering what he believes are the missing words. The system now preferably operates in the same manner as the phrase-based language translation system (European Published Application No 0262938) and recognises the pre-trained keywords in order to identify the phrase being uttered. The system then enunciates the correct response/translation back to the student in a native speaker's voice, and gives the student an opportunity to repeat his translation if it was incorrect, if he was not happy with the pronunciation, or if the recogniser 1 was unable to identify the correct foreign phrase. In the event that the student is unable to decide whether the recogniser 1 has assimilated his intended meaning, the source language version of the recognised foreign phrase can be displayed at the same time. Incorrectly translated phrases are re-presented (visually or verbally) to the student later in the training cycle for a further translation attempt.

If the recogniser 1 repeatedly fails to identify the correct phrase because of poor key word recognition and drifting student pronunciation, the student will be asked to recite each key word present in the correct translation for separate recognition. If one or more of these keywords is consistently misrecognised, new templates are generated as discussed above.

Phrases are presented to the student for translation in an order which is related to their frequency of use in the domain of interest. The system preferably enables the trainee to suspend training at any point and resume at a later time, so that he is able to progress as rapidly or as slowly as he wishes.

The preferred type of phrase recognition (described in European Published Application No 0262938 and 'Machine Translation of Speech' Stentiford & Steer, British Telecom Technology Journal Vol 6 No. 2 April '88 pp 116–123) requires that phrases with variable parameters in them such as dates, times, places or other sub-phrases, should be treated in a hierarchical manner. The form of the phrase is first identified using a general set of keywords. Once this is done, the type of parameter present in the phrase can be deduced and a special set of keywords applied to identify the parameter contents. Parameters could be nested within other parameters. As a simple example, a parameter might refer to a major city in which case the special keywords would consist of just these cities. During student training translation, errors in parameter contents can also be treated hierarchically. If the system has identified the correct form of phrase spoken by the student, but has produced an incorrect parameter translation, the student can then be coached to produce the correct translation of the parameter in isolation, without having to return to the complete phrase.

Parameters are normally selected in a domain of discourse because of their occurrence across a wide range of phrases. It is natural therefore that the student should receive specific training on these items if he appears to have problems with them.

The keywords are selected according to the information they bear, and how well they distinguish the phrases used in each subject area. This means that it is not necessary for the system to recognise every word in order to identify the phrase being spoken. This has the advantage that a number of speech recognition errors can be tolerated before phrase identification is lost. Furthermore, correct phrases can be identified in spite of errors in the wording which might be produced by a novice. It is reasonable to conjecture that, if the system is able to match attempted translations with their corrected versions, such utterances should be intelligible in practice when dealing with native speakers who are aware of the context. This means that the system tends to concentrate training on just those parts of the student's diction which give rise to the greatest ambiguity in the foreign language. This might be due to bad pronunciation of important keywords or simply due to their omission.

The described system therefore provides an automated learning scheme which can rapidly bring language students up to a minimum level of intelligibility, and is especially useful for busy businessmen who simply wish to expedite their transactions, or holiday makers who are not too worried about grammatical accuracy.

The correct pronunciation of phrases is given by the recorded voice of a native speaker, who provides the appropriate intonation and co-articulation between words. The advanced student is encouraged to speak in the same manner, and the system will continue to check each utterance, providing the word spotting technology employed is able to cope with the increasingly fluent speech.

Figure 3:
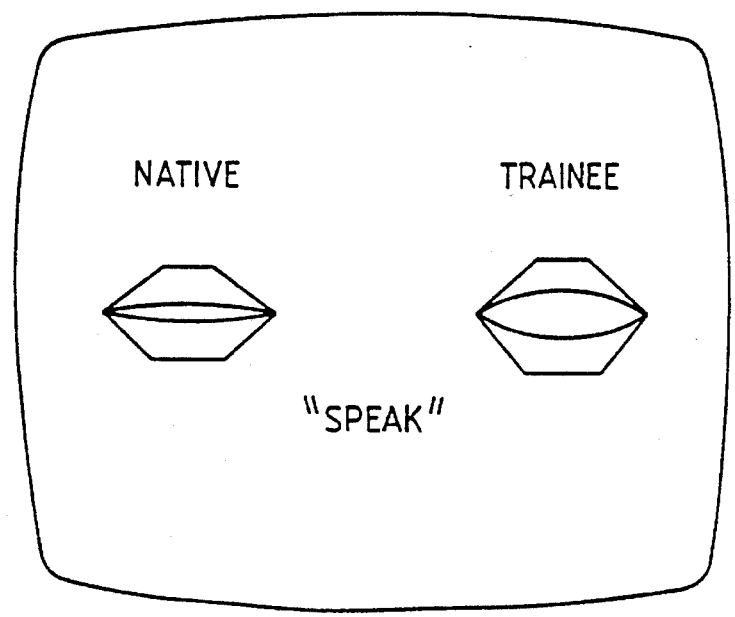
FIG. 3 illustrates a display in an apparatus for language training according to another aspect of the invention.

Referring to FIG. 3, in another aspect of the invention, a visual display of the mouth of the native speaker is provided so as to exhibit the articulation of each spoken phrase. This display may conveniently be provided on a CRT display using a set of quantised mouth shapes as disclosed in our previous European Published Application No. 0225729A. A whole facial display may also be used.

In one simple embodiment, the display may be mounted in conjunction with a mirror so that the applicant may imitate the native speaker.

In a second embodiment, a videophone coding apparatus of the type disclosed in our previous European Published Application No. 0225729 may be employed to generate a corresponding display of the student's mouth so that he can accurately compare his articulation with that of the native speaker. The two displays may be simultaneously replayed by the student, either side by side, or superimposed (in which case different colours may be employed), using a time-warp method to align the displays.

I claim:

1. Apparatus for pronunciation training comprising:

a speech generator for generating utterances to prompt a trainee;

a controller for generating speech templates from utterances by the trainee in response to prompts from the speech generator of words from a predetermined selected set of words;

a speech recognizer for recognizing, in a trainee's current utterances, words from the predetermined selected set of words by comparing each of the trainee's current utterances with said speech templates; and an output device indicating improvement in the trainee's pronunciation based on increases in a deviation of the trainee's current utterances from the speech templates.

2. Apparatus according to claim 1, wherein the controller updates the speech templates from the trainee's current utterances when the said deviation exceeds a predetermined value.

3. Apparatus according to claim 1, wherein the speech recognizer recognizes in the trainee's response to the prompt one or more words from the set of words, and wherein the speech generator generates an utterance depending on the one or more words recognized by the speech recognizer.

4. Apparatus for pronunciation training according to claim 3, further comprising:

phrase recognition means for identifying phrases by a combination and order of words from the predetermined selected set, wherein when the trainee is prompted by an utterance generated by the speech generator to utter a phrase, the phrase recognition means recognizes the phrase and selects the utterance generated by the speech generator to be a reply to the phrase.

5. A pronunciation training apparatus according to claim 1, further comprising:

a video generator for generating corresponding video images of a mouth to prompt a trainee to imitate a correct pronunciation of the generated utterances.

6. Apparatus according to claim 5, further comprising:

a video analyzer for analyzing mouth movements of the trainee and displaying corresponding synthesized and analyzed mouth movements generated by the video generator and by the trainee.

7. Language training apparatus according to claim 1, wherein the speech generator generates utterances in a language in the accent of a native speaker of that language.

8. A method of pronunciation training, comprising:

prompting a trainee to pronounce a series of words;

generating trainee speech templates from the trainee's pronunciations;

prompting a trainee to speak an utterance;

analyzing the utterance using the trainee speech templates; and assessing improvements in pronunciation by measuring a difference between the utterance and a corresponding trainee speech template, wherein an increase in difference corresponds to an improvement in pronunciation.

9. A method according to claim 8 further comprising the step of:

updating the speech template when the difference exceeds a predetermined value.

10. A system for training a speaker's pronunciation, comprising:

a speech synthesizer for generating synthesized speech to prompt the speaker to generate speech samples;

control circuiting for determining speech pronunciation characteristics from the speaker's initial speech samples generated in response to speech synthesizer prompts;

processing subsequent speech samples of the speaker to determine a deviation from the determined speech pronunciation characteristics and indicating progress in the speaker's pronunciation based on an increase in the deviation.

11. The system according to claim 10, further comprising:

means for modifying the derived pronunciation characteristics when the deviation exceeds a predetermined threshold.

12. The system according to claim 10, wherein said speech synthesizer prompts speech from the speaker in a foreign language and the means for receiving receives speech samples from the speaker in the foreign language.

13. The system according to claim 10, wherein the speech pronunciation characteristics include key words and phrases.

14. The system according to claim 10, wherein the speech synthesizer prompts the speaker using words in a native language of the speaker and the means for processing processes subsequent responsive speech samples received in a foreign language corresponding to translations of the native language words.

15. The system according to claim 10, wherein the speech synthesizer prompts the speaker using words in a foreign language and the control circuitry processes subsequent speech samples received from the speaker in a foreign language.

16. The system according to claim 10, wherein the speech synthesizer generates words and phrases using the accent of a native speaker of a foreign language.

17. The system according to claim 10, further comprising:

a video generator for generating video images of a human mouth configured to correspond with proper pronunciation of the synthesized speech samples to assist the speaker in a response.

18. A method of pronunciation training comprising:

prompting a trainee using words generated by a speech generator in a secondary language different than a primary language of the trainee as pronounced by a native speaker of said secondary language, the trainee pronouncing speech in the secondary language in response to said prompting;

deriving trainee speech templates from the speech in the secondary language pronounced by said trainee;

prompting dialog responses from said trainee in said secondary language via said speech generator;

comparing said dialog responses to corresponding ones of said trainee speech templates; and indicating progress in pronunciation as differences between said dialog responses and said corresponding trainee speech templates increase.

19. The method according to claim 18, further comprising:

updating said trainee templates when a difference between said dialog responses and said trainee templates exceeds a threshold.

20. The method according to claim 18, wherein said dialog generating step includes:

generating a video image of said native speaker's mouth shape synchronized with said generated secondary dialog speech.

21. The method according to claim 18, further comprising:

analyzing shapes of the mouth of said trainee during said dialog responses.

* * * * *